US005089972A

United States Patent [19]

Nachman et al.

[11] Patent Number: 5,089,972

[45] Date of Patent: Feb. 18, 1992

[54] MOORED SHIP MOTION DETERMINATION SYSTEM

[75] Inventors: Marcus Nachman; Robert H. Overton, both of Virginia Beach, Va.

[73] Assignees: Nachman Precision Systems, Inc., Virginia Beach; Daniel H. Wagner Associates, Inc., Hampton, both of Va. ; a part interest

[21] Appl. No.: 626,743

[22] Filed: Dec. 13, 1990

[51] Int. Cl.[5] .................... B65G 67/60

[52] U.S. Cl. .................... 364/478; 414/139.7

[58] Field of Search .................... 364/478, 559; 414/139.7, 640.3, 139.6

[56] References Cited

U.S. PATENT DOCUMENTS

| | | | |
|---|---|---|---|
| 3,189,195 | 6/1965 | Fox | 414/139.7 |
| 3,189,196 | 6/1965 | Carl | 414/139.7 |
| 3,952,891 | 4/1976 | Terayama et al. | 414/140.3 |
| 4,172,685 | 10/1979 | Nabeshima | 414/139.7 |
| 4,180,171 | 12/1979 | Cunningham | 212/156 |
| 4,547,857 | 10/1985 | Alexander | 364/505 |
| 4,666,357 | 5/1987 | Babbi | 414/138.4 |
| 4,713,798 | 12/1987 | Kay | 367/96 |
| 4,753,357 | 6/1988 | Miyoshi | 364/478 |

*Primary Examiner*—Parshotam S. Lall
*Assistant Examiner*—S. A. Melnick
*Attorney, Agent, or Firm*—Wallace J. Nelson

[57] ABSTRACT

A system is disclosed for accurately measuring the position of a moored container ship relative to a fixed pier after loading or unloading each container on the ship and including a processor mechanism employed to combine the measured relative position with previously acquired data indicating the ship position prior to the loading or unloading of the previous container, and utilizing the combined data to facilitate automatic control of placing or removing a subsequent container on the ship by a crane structure. The system is applicable for measuring six degrees of freedom of movement of any large object.

6 Claims, 3 Drawing Sheets

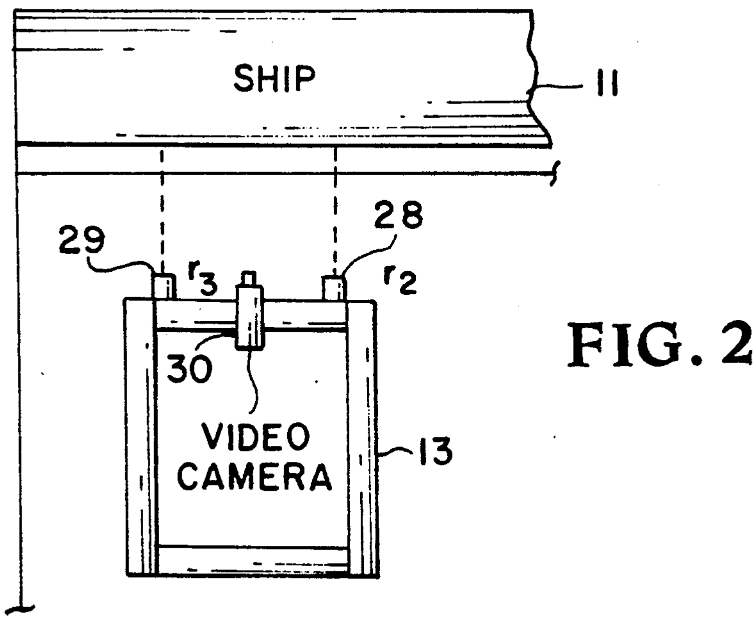
FIG. 2
FIG. 3
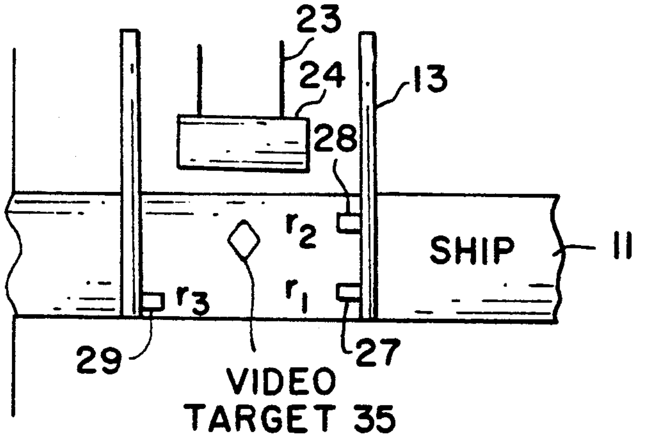
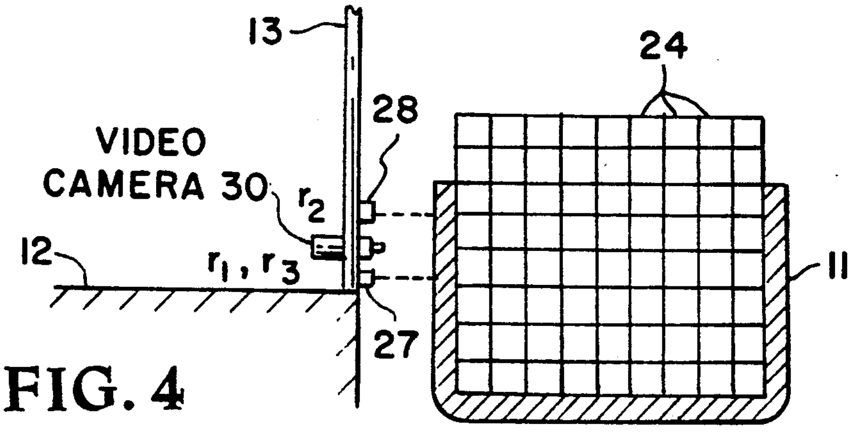
FIG. 4

FIG. 8
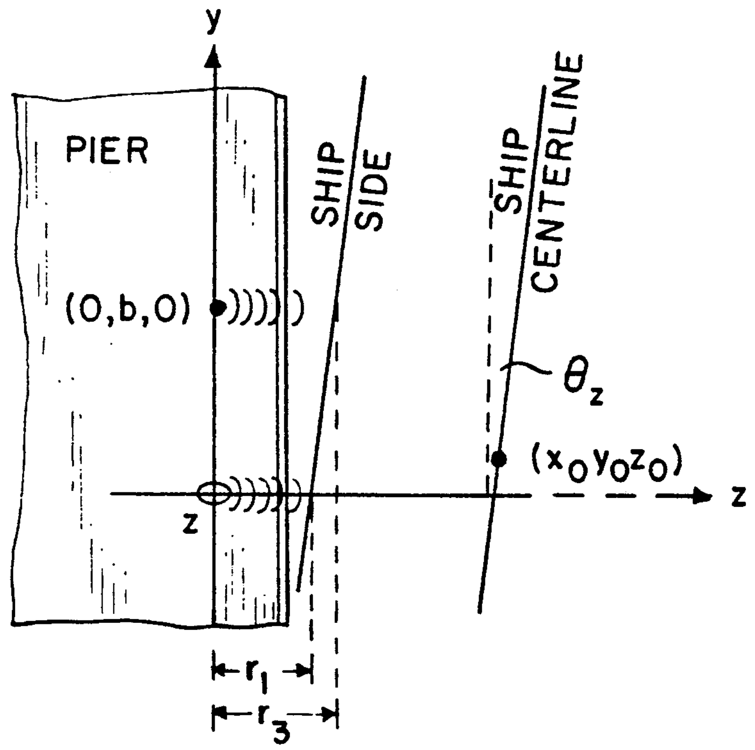
FIG. 6
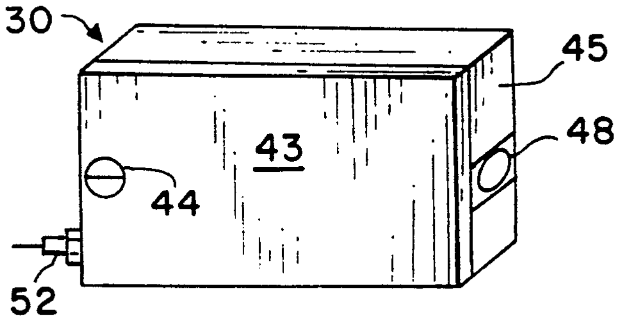
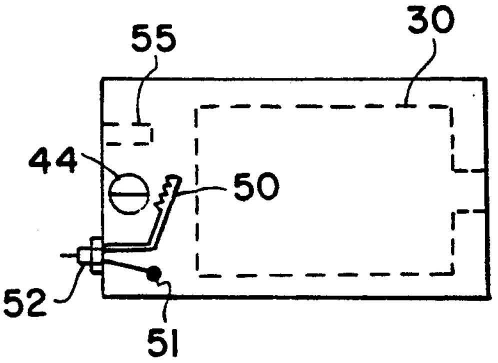
FIG. 7

MOORED SHIP MOTION DETERMINATION SYSTEM

ORIGIN OF THE INVENTION

Portions of this invention were made with Government support under award number ISI-8860547 awarded by the National Science Foundation. Accordingly, the Government has certain rights in this invention.

FIELD OF THE INVENTION

This invention relates generally to motion detection systems and relates specifically to a system for detecting motion of a moored ship through six degrees of freedom to facilitate accurate positioning and automatic loading-/unloading of containerized cargo, from a dock onto a ship, by a crane system.

BACKGROUND OF THE INVENTION

The use of modern container ships to transport containerized cargo has become one of the primary means for shipping numerous types of cargo. Standard size containers and automatically operated crane systems substantially increase the productivity while reducing the manpower required and hazards incurred in loading and unloading freight transporting ships. Complete automatic loading and unloading of containers to and from a specific position on the ship is impeded by motion of the ship relative to the pier/crane. This motion is the result of winds, shifting tides, movement of the ship due to the addition of or removal of each container, and the like. Ship motion during and between loading or unloading of successive containers is sufficient to prevent complete automatic and exact placement of containers without tracking the ships position. At present, some fine adjustment of each container position is usually required by the crane operator due to the ship's motion. This additional adjustment is a time consuming, hazardous and costly task that can be improved if the crane were automated to compensate for ship motion.

SUMMARY OF THE INVENTION

It is therefore an object of the present invention to provide a system for improving automation of the process of loading and unloading container ships.

Another object of the present invention is to provide a sensor system for predicting the position, orientation and motion of a ship with sufficient accuracy to enable the controlling device of a crane to automatically compensate for these variables and in order to place a container at the specified location on the ship.

A further object of the present invention is to provide a sensor and processing system that can accurately and instantaneously determine the exact position of a container ship relative to a fixed pier.

An additional object of the present invention is a motion detection system for accurately determining the exact position of a moored ship during a loading and unloading operation.

According to the present invention, the foregoing and additional objects are attained by providing a container loading crane on a fixed dock in position to load and unload containerized cargo onto, or off, a moored container ship. A sensor system, including three ultrasonic range finders and a CCD video camera, are mounted on the shipboard side of the container loading crane structure. Two of the range finders are mounted near the bottom of the crane structure while the third range finder is mounted approximately six feet above the pier surface. The video camera is also mounted on the crane structure and facing the side of the ship.

The ultrasonic range finders provide direct measurement of the distance of the ship from the pier with one-eighth inch resolution at the maximum distance from the crane to the ship. The video processor provides direct measurement of the height, fore-and-aft position, and pitch of the ship, and indirect measurement of the ship roll. Automatic focusing of the video lens onto a designated area of approximately three feet square at the minimum range from the crane to the ship is required. Each of the ultrasonic range finders and the video camera is provided with a temperature controlled all weather enclosure and affixed to the crane structure on a vibration-free mount. The system is designed to be all-weather however, processing of the video data must include reliability testing to ensure that in unusually low visibility weather, such as dense fog or heavy snowfall, the processor notifies the crane operator that manual control is required.

In the normal operation of the sensor system of the present invention, the initialization of values of ship position and orientation relative to the crane are determined by external means. Following this initialization, the sensor system provides all updated information. The estimated values for the ship position are obtained between each loading or unloading operation and these values are sent to the crane processor. These estimated values are converted by the processor into an estimated position for the next container, along with an estimate of the error in that prediction. The next container can then be quickly and automatically moved to that precise spot with the state vector being continually updated to adjust for additional ship motion.

BRIEF DESCRIPTION OF THE DRAWINGS

A more complete appreciation of the invention and many of the attendant advantages thereof will be more readily apparent as the same becomes better understood with reference to the following detailed description when considered in connection with the accompanying drawings, wherein:

FIG. 2 is a part schematic representation of a portion of the assembly shown in FIG. 1 and illustrating the top view of the crane support structure adjacent the dock side of the pier shown in FIG. 1 and illustrating the location of the ship motion and position sensors disposed thereon;

FIG. 3 is a part sectional, part schematic rear view of the structure shown in FIG. 2 and further illustrating the position relationship of the container ship and the ship motion and position sensors disposed on the crane structure;

FIG. 4 is a part schematic side view of the structure shown in FIGS. 2 and 3 further illustrating the position relationship of the container ship and the ship motion and position sensors according to the present invention;

FIG. 6 is a part schematic view of the video camera housing employed in the present invention;

FIG. 7 is a view similar to FIG. 6 with parts broken away and schematically showing the components housed within the camera housing; and FIG. 8 is a schematic diagram of the coordinate system employed in the ship motion determination according to the present invention.

DETAILED DESCRIPTION

Figure 1:
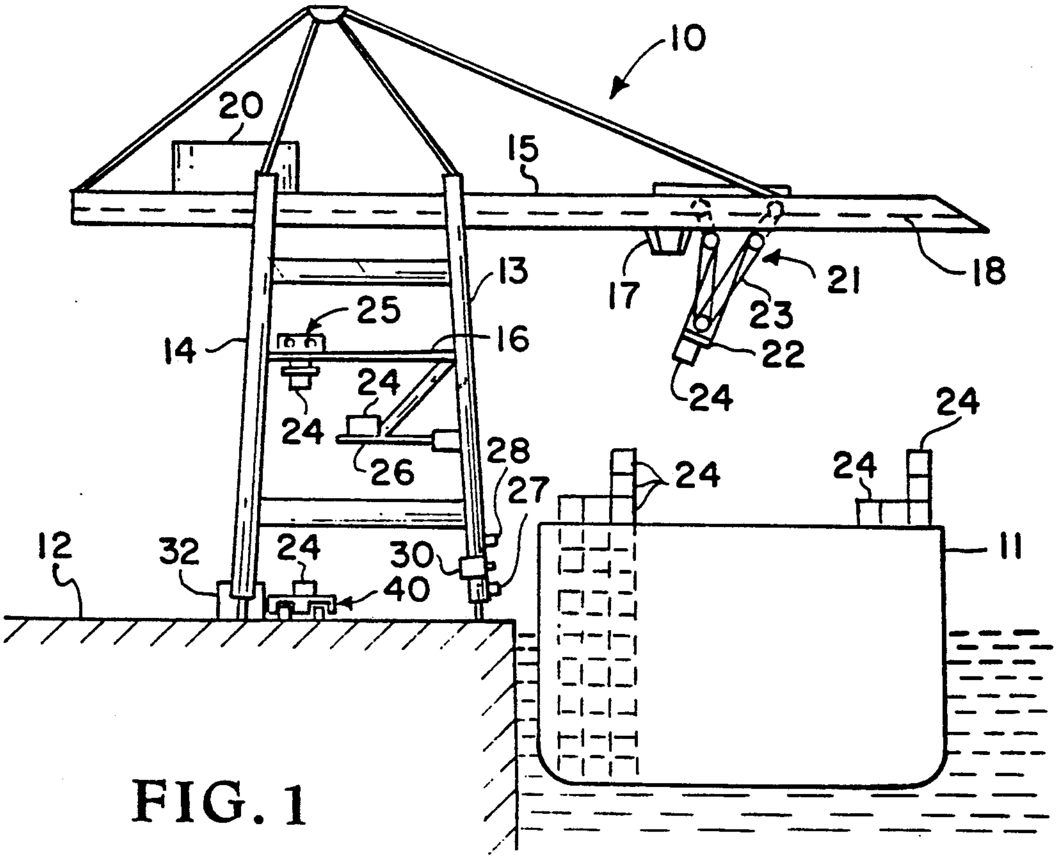
FIG. 1 is a schematic representation of an exemplary crane disposed on a fixed pier in position to load/unload a container ship and employing the motion determination system of the present invention.

Referring now to the drawings and more particularly to FIG. 1, there is shown a schematic side view of an exemplary crane assembly employing the present invention, and designated generally by reference numeral 10. Crane 10 is disposed on a fixed pier, or dock, 12 and adapted to load/unload containerized cargo on container ship 11. Crane 10 is provided with vertical supporting structures partially visible in this FIG and designated by reference numerals 13 and 14. Vertical support structures 13,14 serve to support horizontal arms or girders 15 and 16. Suitable wheels (not designated) are provided at the base of vertical support structures 13,14 to permit unrestricted crane travel about dock 12. Alternatively, the wheels of crane 10 may be disposed on tracks (not shown) to limit movement of crane 10 along the track, in a conventional manner. A wheeled carriage or trolley 17 is movable along a track 18 disposed on horizontal arm 15. An electrically operated crane motor is housed within crane motor housing 20 disposed on grider 15, as will be further explained hereinafter.

During operation, the crane operator rides in the cab of trolley 17 and maintains visual contact with hoist attachment device 21. Hoist attachment device 21 includes a spreader mechanism 22 that attaches, via conventional twist lock mechanism, to all four corners of an individual freight container 24. Containers 24 are of two basic sizes, each essentially eight feet wide and either slightly less than twenty feet, or slightly less than forty feet, long. The vertical position of spreader mechanism 22 is controlled by a series of crossing cables or ropes, some of which are shown in FIG. 1 and designated by reference numeral 23. Ropes 23 pass through blocks on trolley 17 and connect with suitable winches (not shown).

In operation, the crane operator in trolley 17 picks up a container 24 that has been positioned on platform 26 for loading onto container ship 11. In automated crane systems, the containers may also be stacked on the pier or taken directly from the truck chassis bed. When employing separate platform 26 on crane 10, a separate hoist mechanism 25 is also employed to first remove individual containers 24 from a truck 40 onto crane platform 26 and then each container is lifted from platform 26 to its destination on board the ship. These two steps are carried out by two entirely different hoist mechanisms 21,25 and under the supervision of two different operators.

The initial process of attaching the spreader of hoist mechanism 25 to container 24 on the pier, or on a truck 40, is manually intensive however, from the time the container reaches a height of eighteen feet on platform 26, the procedure may be automated. The operator of trolley 17 lifts container 24 high enough to clear the side of ship 11 and any containers already loaded above the deck, while running trolley 17 out arm 15 for automatic positioning of the spreader 22 and attached container 24 directly above its destination.

If ship 11 were to remain completely stationary, automated crane operation would be much easier to accomplish. However, due to winds, tides, shifting weight after each container is loaded or unloaded, and other factors, moored ships are, with little exception, subject to motion. This motion is adequate to prevent full automation of the loading process without tracking and compensating for that motion. It has been observed that ship motion during the intervals between periods of loading are considerably less pronounced to thereby indicate that the loading process might be the major contributor to observed ship motion. To accurately measure and compensate for this ship motion, a set of three ultrasonic range finders are secured to crane vertical support 13, facing ship 11, and disposed in a triangular pattern. Two of these range finders are visible in FIG. 1 and designated by reference numerals 27 ($r_1$) and 28 ($r_2$). The third range finder 29 ($r_3$) is illustrated more clearly in FIGS. 2 and 3. Range finders 27 and 29 are essentially parallel with the surface of pier 12 and are mounted near the bottom, and on separate spaced legs, of vertical support 13. Range finder 28 is vertically spaced from, and mounted on the same leg of vertical support 13 as, range finder 27. A video camera 30 is also mounted on vertical support 13 and faces the side of container ship 11.

FIG. 2 illustrates the ultrasonic range finders 28,29 and video camera 30 relative to container ship 11, as seen looking from the top of crane vertical support 13. Range finder 27 is obscured from view in this FIG by range finder 28.

FIG. 3 is a partial rear view of the crane 10 looking toward container ship 11 and illustrates a video target 35 on ship 11. The position of range finders 27,28 and 29, as disposed on the legs of vertical supports 13, are also illustrated in this FIG.

FIG. 4 is similar to FIG. 1 and more clearly illustrates the position of video camera 30 and range finders 27,28 relative to container ship 11. Range finder 29 is obscured from view in this FIG by range finder 27.

Figure 5:
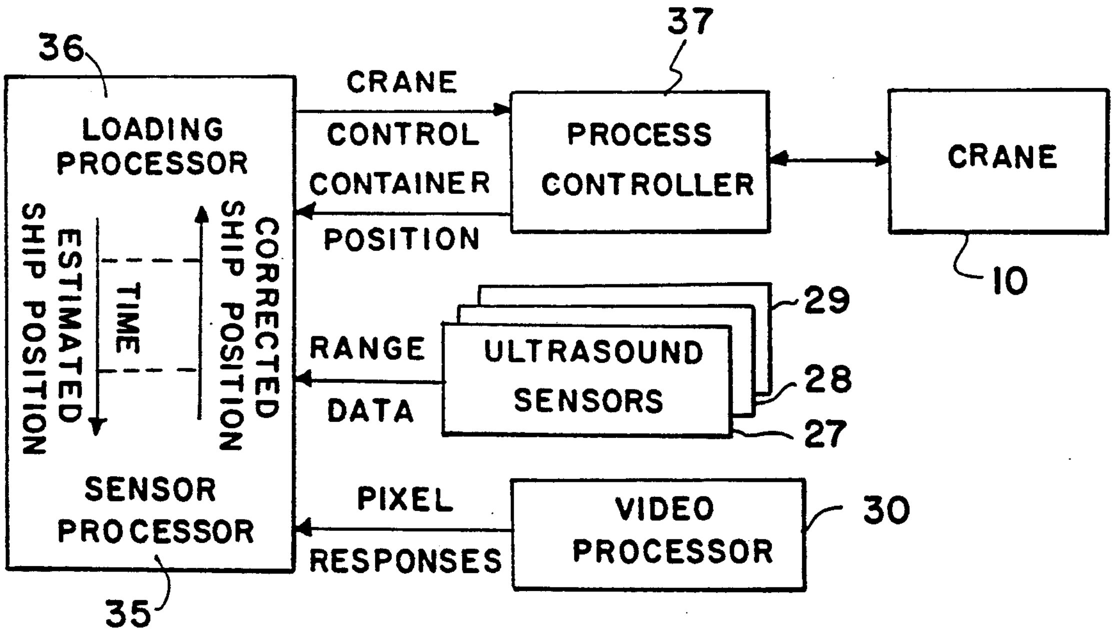
FIG. 5 is a schematic flow diagram illustrating the necessary interfaces for data flow and sensor and information process of the present invention.

The data flow structure and processing units necessary for sensor input and tracking computations and updates for ship motion determination are illustrated in the schematic diagram of FIG. 5. As shown therein, range data from sensors 27,28 and 29 and pixel responses from video camera/processor 30 are transmitted to a sensor processor 35. Sensor processor 35 combines this data with container position data received through a loading processor 36 from a process controller 37 disposed on crane 10. All of this data is then combined with estimated ship position data received from loading processor 36 to derive a "corrected ship position" that is fed into the crane controls through process controller 37 for accurate positioning of a container 24 relative to the actual position of the ship 11 by crane within one inch 90% of the time and within 2.7 inches all of the time 10.

All processor controls are supervised by an operator positioned in process control housing 32 located at the base of crane 10. The automatic crane controls are capable of being manually overridden, when deemed necessary, by the crane operator in trolley 17. A conventional electrical power supply (not shown) is employed for the crane motor and other electrical components with an emergency back-up battery system utilized when needed. The power supply and electrical connections are not shown or further described herein in the interest of clarity and brevity.

Referring now more particularly to FIGS. 6 and 7, the details of video camera unit 30 will now be described. The exterior housing 43 is designed to be weather proof and vibration free and is constructed of a suitable plastics, such as Lexan or equivalent. Housing 43 must meet NEMA/ASTM standards for environmental protection and is certified, to at least one atmosphere, completely waterproof. A closure lock 44 is provided on one side of housing 43 and, when unlocked, permits removal of this entire side to permit access to the interior of the housing. Suitable O-ring gasket seals (not shown), provided between the contacting surfaces of the housing side and the remainder of the housing, ensure waterproof sealing of the housing when closed.

The front of housing 43 is provided with a sliding closure gate 45 for selectively exposing lens 48 of camera 30. A low voltage heater 50 and a Type J thermocouple 51 are electrically connected, via cannon type connector fitting 52 extending through housing 43, to a suitable electric supply (not shown). A suitable desiccant 55 is also provided within housing 43 for internal moisture control. A metal backing plate (not shown) for housing 43 is countersunk within the base wall portion to provide suitable tripod mounting of the instrument. Housing 43 is mounted on the crane base as indicated with the conventional mounting structure not illustrated in the interest of clarity. Housing 43 is mounted on crane support 13 with an adjustable aiming angle of 30 to 60 degrees, as indicated.

Similar environmental protection housings are provided for each of the ultrasonic range finders 27, 28, 29. Commercially available Icolete and Helix housings are suitable for practice of the present invention. Also, suitable shade protection is provided on crane vertical support 13 to shade each of the housed units 27, 28, 29 and 30 from direct exposure to the sun and precipitation.

A mathematical model for the ship motion wherein the observations of ultrasonic range finders 27,28 and 29 and video CCD 30 are integrated to update the position of ship 11 has been developed. In this process, fundamental concepts include (1) The State Vector x describes the true ship position and motion;

(2) The Estimated State Vector e is the sensor system determination of x;

(3) The Observation Model infers e from the sensor observations; and (4) The Motion Model predicts a state vector p at some future time, given e.

Assuming the ship to be a rigid object, the ship position and orientation with respect to the pier can be described completely by a six-state vector as illustrated in the coordinate system of FIG. 8. In this illustration x,y,z are chosen the coordinates of any point in space, where the x-axis is perpendicular to the pier, the y-axis is oriented parallel to the pier, and the z-axis is vertical, and where the origin is a fixed point on the pier, near the base of the crane. Then the position of the ship is given by a vector $(x_O,y_O,z_O,\theta_X,\theta_Y\theta_Z)^T$, where $x_O,y_O,z_O$ is the position of a fixed point on the ship, and $\theta_X,\theta_Y,\theta_Z$ are angles of pitch, roll, and heading (relative to the x-y- and z-axis), respectively. The ultrasound range finders are located at (O,O,O), (O,O,a), and (O,b,O), while the video camera is at any position in the y-z plane.

Because the process is re-initialized for each row of containers, the reference point $(x_O,y_O,z_O)$ may be taken to be the midpoint of the current container row, i.e., $y_O$ is at the middle of the crane, $x_O$ is the distance of the midline of the ship from the crane, and $z_O$ is the height of the nominal center of gravity of the ship. The choice of these values instead of the center of gravity (CG) is motivated by the following considerations: (1) The exact position of the CG is not known, and changes somewhat with each container loaded or unloaded. These changes are highly nonlinear and difficult to predict. (2) If the ship point is fixed $(x_O,y_O,z_O)$, the major reason for using a nominal CG is that the ship presumably rotates about that point, or nearly. In fact, observations indicate that the ship is always pressed against the pier at at least one point, and restrained in its motion by at least six hawsers with automatic tensioning devices, so it is very unlikely that the pivot point of the yaw (change in heading) component is near the CG. Pitch might still be centered near the CG, but observed changes in pitch are insignificantly small, so little error is induced by assuming the ship rotates on the row of containers being loaded. The one significant angular change is roll, and that fact necessitates using a point on the midline, near the CG height. (3) The purpose of the state vector estimate is to indicate the precise location of the container destination (or, for unloading, its current location). Choosing $x_o,y_o,z_o$ near that destination induces smaller errors in this derived position which occur due to mis-estimates of $\theta_x,\theta_y$, and $\theta_z$.

The general equation of ship motion is given by:

$$x(t)=\Phi(t,t_O)x(t_O)+w(t,t_O) \quad (1)$$

where $$x(t)=(x_O,y_O,z_O,\theta_X,\theta_Y,\theta_Z,x'_O,y'_O,z'_O,\theta'_X,\theta'_Y,\theta'_Z)^T \quad (2)$$

$\Phi(t,t_O)$ = State Transition Matrix $w(t,t_O)$ = Process noise.

As described hereinbefore, changes in the position-state vector occur over very long periods (several minutes, or even hours) as a result of wind, tide, and overall cargo weight, and over short periods (20 seconds to a minute) as a result of wave motion, cargo loading and ballast changes. Over the time intervals of interest, during which a container is being loaded and controls must be applied to change its destination (20–40 seconds), the long-term motions are imperceptible. The short-term motions, however, are too severe to be ignored, and too unpredictable to be extrapolated linearly for more than a few seconds. The solution is to employ a first-order model for predictions from one observation to the next (¼ second), and to predict position several seconds ahead (for the purpose of control) by simply using the most recent filtered position.

An alternative to the first-order model is the Integrated Ornstein-Uhlenbeck (IOU) model, in which the first-derivative states are heavily damped, so they decay to zero in a few seconds. The defining equation for this model is:

$$x(t+\Delta t) = x(t) + \frac{1-e^{-\lambda t}}{\lambda}\cdot x(t) \quad (3)$$

where $\lambda>0$ is an arbitrary time constant. The same model could then be used for both the prediction/observation process and for extrapolating the position of the ship to a future time. At the present time, the additional complexity of this solution does not seem justified.

Another alternative is to attempt to model the apparent damped harmonic motion observed in the ship motion data. The defining equation for this model is:

$$x(t+\Delta t)=x(t)+x'(t)\Delta te^{-\lambda\Delta t}(a_1\cos(w\Delta t)+a_2\sin(w\Delta t)) \quad (4)$$

where $a_1$, $a_2$ and w are constant parameters which must be estimated by the filter. The problem with this model, of course, is that much of the power spectrum obtained from the raw data was not located at a single characteristic frequency, and thus $a_1$, $a_2$ and w may be very hard to estimate with enough accuracy to give good predictions for $x(t+\Delta t)$. For this reason, a harmonic motion model is not contemplated.

The noise w in equation (1) is modeled as white, zero-mean Gaussian, with covariance $GQG^T$. A preliminary estimate for the variance of roll rate, based on data, observations and measurements indicate that the maximum rate of motion of the side of the ship is approximately one inch per second, and the minimum is zero, at least three seconds later. This implies an acceleration on the order of one-third inch/sec$^2$, which corresponds to an angular acceleration of $3\times10^{-2}$ deg/-sec$^2$. Over the time between observations ($\frac{1}{8}$ second), $d\theta_Y/dt$ has a maximum change of $4.13\times10^{-3}$ deg/sec. This data is fitted with a Gaussian distribution by taking the maximum change to be a 3-sigma value, to give $var(d\theta_Y/dt)\sim1.7\times10^{-7}$ (deg/sec)$^2$. Of course, the model assumes white noise, whereas the data is highly time-correlated, so this estimate may need some modification in actual practice. Estimates for variances in velocity in the x-direction (perpendicular to the pier) and in the y-direction (along the pier) are estimated at about $2.0\times10^{-4}$ (inch/sec)$^2$. It is known that the magnitude of changes in those states are much smaller than for roll, and for lateral/fore-and-aft motion. Consequently, the variances on all other derivatives are taken to be 1/100 that of the corresponding derivatives on data is available. Since there is no known correlation amongst the states, all off-diagonal elements of $GQG^T$ are zero. Finally, the changes in the position and orientation states are accounted for by their derivative states, and consequently the upper- and left-halves of $GQG^T$ are zero.

To obtain the estimated vector e, the system estimates x by a 12-state vector e in a three-step process. First an a priori estimate $e_O$ is derived from data supplied by the crane control processor. When the first container in a tier is loaded onto the ship, the estimated values of $x_O$, $y_O$, $z_O$, are deduced from the known location of that container on the ship, and the position of the container relative to the crane structure when it was loaded. For the theoretical model, it is assumed that the first container is always loaded at $(x_O, y_O)$, and $z_O$ is at sea level. Values for $\theta_X, \theta_Y, \theta_Z$ are taken from the first range observations, as described below. The time of validity of the initial estimate $x_O$ is also noted.

Each time the sensors produce new data, those sensor data are applied, using the observation models described hereinafter to produce a corrected estimate $e_{i+1}$.

The range finders supply a three-state vector $r=(r_1, r_2, r_3)^T$ consisting of the three simultaneous ranges to the hull. The observation model is given by:

$$r=h(x)+z \quad (5)$$

where x is the state vector, h is a non-linear observation function, and z is white zero-mean Gaussian noise with a priori covariance matrix given by $R=zz^T$. Note that this observation model is substantially different from a linear model in that absolute measurements are taken, rather than relative. This requires modification to a non-linear or extended Kalman filter (EKF), but is justified by the high accuracy observed in ultrasound range finders, and the consequent high accuracy that can be achieved in the state estimates.

The function h is defined as follows. First, the ship side is modeled in the region of interest as a plane, parallel to the fore-and-aft axis of the ship, at a distance h from the center. An equation for this plane is:

$$(x-p)n=h, \quad (6)$$

where $p=(x_P, y_P, z_P)^T$=a point on the plane $x=(x_O, y_O, z_O)^T$=position portion of the state vector n=a vector normal to the plane.

The normal vector n is simply the unit vector in the x-direction, rotated to align with the ship. Thus:

$$n=\begin{bmatrix}\cos\theta_x\cos\theta_z+\sin\theta_x\sin\theta_y\sin\theta_z\\ -\cos\theta_z\sin\theta_x\sin\theta_y+\cos\theta_x\sin\theta_z\\ \cos\theta_y\sin\theta_x\end{bmatrix} \quad (7)$$

The range finders measure distance from the y-z plane to the ship side; that is, each range finder determines $x_P$, from a point in the y-z plane. Substituting (7) into (6) and solving for $x_P$, $$x_P=(h+x_O\cos\theta_Z\cos\theta_Y+y_O\cos\theta_Y\sin\theta_Z-y_P\cos\theta_Y\sin\theta_Z+z_O\cos\theta_X\sin\theta_Y-z_P\cos\theta_X\sin\theta_Y-y_O\cos\theta_Z\sin\theta_X\sin\theta_Y+y_P\cos\theta_Z\sin\theta_X\sin\theta_Y+x_O\sin\theta_Z\sin\theta_X\sin\theta_Y)/(\cos\theta_Z\cos\theta_Y+\sin\theta_Z\sin\theta_X\sin\theta_Y) \quad (8)$$

The three range finders are placed at (O,O,O), (O,O,a) and (O,b,O) respectively, and are aimed parallel to the x-axis. The three corresponding ranges are:

$$r_1=(h+x_O\cos\theta_Z\cos\theta_Y+y_O\cos\theta_Y\sin\theta_Z+z_O\cos\theta_X\cdot\sin\theta_Y-y_O\cos\theta_Z\sin\theta_X\sin\theta_Y+x_O\sin\theta_Z\sin\theta_X\sin\theta_Y)/(\cos\theta_Z\cos\theta_Y+\sin\theta_Z\sin\theta_X\cdot\sin\theta_Y) \quad (9)$$

$$r_2=(h+x_O\cos\theta_Z\cos\theta_Y+y_O\cos\theta_Y\sin\theta_Z-a\cos\theta_X\sin\theta_Y+Z_O\cos\theta_X\sin\theta_Y-y_O\cos\theta_Z\sin\theta_X\sin\theta_Y+x_O\sin\theta_Z\sin\theta_X\sin\theta_Y)/(\cos\theta_Z\cos\theta_Y+\sin\theta_Z\sin\theta_X\cdot\sin\theta_Y) \quad (10)$$

$$r_3=(h+x_O\cos\theta_Z\cos\theta_Y-b\cos\theta_Y\sin\theta_Z+y_O\cos\theta_Y\sin\theta_Z+z_O\cos\theta_X\sin\theta_Y+b\cos\theta_Z\sin\theta_X\sin\theta_Y-y_O\cos\theta_Z\sin\theta_X\sin\theta_Y+x_O\sin\theta_Z\sin\theta_X\sin\theta_Y)/\cos\theta_Z\cos\theta_Y+\sin\theta_Z\sin\theta_X\sin\theta_Y). \quad (11)$$

The observation function h is used to derive the predicted measurement in the filter equations; however, for updating the covariance of the filter estimates the observation matrix H is required which is the $3\times12$ Jacobian dr/dx, of which the last six columns, corresponding to the derivative states of x, are all zero. The remaining 18 entries of H have been published and are not included herein in the interest of brevity.

The assumption that the ship side is planar is critical to this analysis. For most container ships, this assumption is valid, except possibly at the most extreme rows of containers, near the bow and stern of the ship. This is because the superstructures of most ships are at the ends, and the ships are designed to stow containers efficiently in their holds, so they have flat sides. However, some ships, including C10 ships, carry containers all the way forward and all the way aft, and have slightly rounded sides for greater seaworthiness. For these ships, the predicted position, based on the equation above, would be corrected by adjustments of the measurements at that position, based on detailed ship plans kept in the sensor system data base.

The second measurement vector consists of video observations of motions of the side of the ship, in the plane perpendicular to the line of sight:

$$v=(\Delta x,\Delta y), \tag{12}$$

where Δx is the lateral motion of a point on the ship side, and Δy is the vertical motion, since the last observation.

Letting (x,y,z) be a point within the observation field of the video camera, then:

$$y = (h + (x_O - x_P)\cos\theta_Z\cos\theta_Y + y_O\cos\theta_Y\sin\theta_Z + (z_O - z_P)\cos\theta_X\sin\theta_Y - y_O\cos\theta_Z\sin\theta_X\sin\theta_Y + (x_O - x_P)\sin\theta_Z\sin\theta_X\sin\theta_Y)/(\cos\theta_Y\sin\theta_Z - \cos\theta_Z\sin\theta_X\sin\theta_Y) \tag{13}$$

and $$z = (h + (x_O + x_P)\cos\theta_Z\cos\theta_Y + (y_O + y_P)\cos\theta_Y\sin\theta_Z + z_O\cos\theta_X\sin\theta_Y - (y_O - y_P)\cos\theta_Z\sin\theta_X\sin\theta_Y + (x_O - x_P)\sin\theta_Z\sin\theta_X\sin\theta_Y)/(\cos\theta_X\sin\theta_Y)$$

Note that the video observation type differs from the range finder type in two important ways. First, no absolute information is obtained, so these data cannot be used to initialize the position vector, and second, because only relative motion is seen, the observation is very well approximated by a linear model. The implication of this second feature is that the usual Kalman filter update can be used. The 2×12 observation matrix H is the Jacobian dv/dx associated with the observation v. The non-zero states of H have also been published and are not included here in the interest of brevity.

In addition to calculating the filter variables, the sensor system must test each observation after the first for credibility. This is accomplished by comparing the actual observation with the observation which was predicted from the previous updated state vector. Variations larger than a given value will result in an alarm being sent to the crane operator, indicating that manual loading should be used until the sensor data falls within these reasonable limits.

For the motion model, the predicted position p at the time of the $i^{th}$ observation is calculated by the formula:

$$P_i=\Phi e$$

and the covariance in p, denoted $\widehat{P}_i$, is predicted by $$\widehat{P}_i=\Phi P_i\Phi^T+GQG^T,$$

where $GQG^T$=covariance matrix of the process noise.

Φ=linear extrapolation matrix.

Finally, the updated estimate of the position is given by:

$$e_{i+1}=\Phi e_i+K(z-h\Phi e_i) \tag{14}$$

where K is a 12×3 gain matrix defined by:

$$K=\widetilde{P_i}H^T[H\widetilde{P_i}H^T+R]^{-1}, \tag{15}$$

and the covariance of the estimate is given by:

$$P_{i+1}=(I-KH)\widetilde{P_i}, \tag{16}$$

where I is the 12×12 identity matrix.

In the actual sensor system, these estimated values will be sent to the crane control processor 37 (FIG. 5), which converts them into an estimated position for the next container and an estimate of error in that prediction. This allows the next container to be quickly and automatically moved to that precise spot, with the state vector being continually updated to adjust for any additional motion of the ship.

As discussed hereinbefore, ultrasonic range finders 27, 28 and 29, as well as video camera 30, must be provided with weather-proof and vibration-free support housings 43.

Operating power for all sensors will be provided by a DC power supply (not shown). The Type J thermocouple 51 can sense the ambient temperature inside the enclosure and provide input to a single setpoint controller. This controls current flow to the heater-resistor 50 mounted inside the enclosure. The heater 50 is activated when necessary to ensure proper operation of the sensors.

In the specific embodiment described herein the ultrasonic range finders 27,28,29 were one way type electronic transducers as employed in Polaroid ultrasonic ranging systems.

The video lens system employed must be capable of focusing on an area approximately three feet square at the minimum range to the ship from the crane and automatic focusing is required. A 510 (H)×492 (V) pixel charge coupled device (CCD), Model No. WV-CDSO was employed for the specific embodiment of the present invention described herein. This device was manufactured by Panasonic and OEMed by Cognex as a component of their Cognex 2000 series Frame Grabber and processor.

Although the invention has been described relative to specific embodiments thereof, it is not so limited and there are numerous modifications and variations thereof that will be readily apparent to those skilled in the art in the light of the above teachings.

For example, although the invention has been described relative to container ship loading/unloading, it is equally applicable to measuring six degrees of freedom movement of any large object.

It is therefore to be understood that, within the scope of the appended claims, the invention may be practiced other than as specifically described herein.

What is claimed as new and desired to be secured by Letters Patent of the United States is:

1. In combination, a system for measuring six degrees freedom of movement of a moored ship position relative to a fixed pier and crane on said pier after loading or unloading a container on the ship, processor mechanism for combining the measured relative position with data indicating the ship position prior to the loading or unloading of the container, and means for utilizing the combined data to enable automatic control in placement or removal of a subsequent container on the ship by said crane.

2. The combination of claim 1 wherein said system for measuring six degrees freedom of movement of a moored ship relative to said fixed pier and said crane includes an array of spaced ultrasonic range finders mounted on said crane and directed toward the moored ship.

3. In combination with a fixed pier, a container ship moored to said pier, and a cargo crane disposed on said pier to facilitate loading and unloading of containers between said ship and said pier, comprising:

a measuring system supported by said crane for measuring the position of said ship relative to said pier after loading or unloading of a specific container;

processor mechanism for combining the measured relative position of said ship with data indicating the ship position prior to the loading or unloading of the container;

means for utilizing the combined data to enable control placement or removal of a subsequent container on the ship by said cargo crane;

said measuring system supported by said crane including an array of spaced ultrasonic range finders carried by said crane and directed towards said container ship;

a video camera carried by said crane and directed toward a specific fixed target area on said ship;

said processor mechanism including (1) a sensor processor on said crane serving to receive range data from said range finders and pixel responses from said video camera;

(2) a loading processor; and (3) a processor controller, wherein said process controller conveys data to said loading processor from said crane as to the exact location of the previously loaded container, or the spot from which the previously unloaded container was taken from said container ship, said loading processor conveys the data received from said processor controller to said sensor processor and said sensor processor combines the data received from said loading processor with the position data received from said ultrasonic range finders and from said video camera and, after adding an estimate of error thereto, conveys this combined data through said loading processor and said process controller to the crane controls to designate the exact position on said container ship where the next container is to be loaded or unloaded.

4. A motion determination system for continuously measuring motion of a moored container ship during a loading and unloading operation and means for employing this measured motion to facilitate automatic loading or unloading of containers on said ship comprising, in combination:

a fixed pier having a container ship moored thereto;

a cargo crane having automatic controls disposed on said fixed pier and serving to load and unload containers between said ship and said pier;

an array of ultrasonic range finders supported on said crane and directed toward said container ship;

a video camera supported on said crane and directed at a specific fixed target area on said ship; and processing mechanism on said crane for receiving data from said array of ultrasonic range finders and said video camera and converting the data received into combined data predicting the exact location of said ship relative to said pier and transferring this combined data to said automatic controls of said crane.

5. The motion determination system of Claim 4 wherein said processing mechanism includes a sensor processor, a loading processor, and a processor controller, said processor controller serving to convey data to said loading processor from said crane as to the exact location of the previously loaded container, said loading processor conveys the data received from said processor controller to said sensor processor and said sensor processor combines the data received from said loading processor with the position data received from said ultrasonic range finders and from said video camera and, after adding an estimate of error thereto, conveys this combined data through said loading processor and said process controller to said automatic crane controls to designate the exact position on said container ship where the next container is to be loaded.

6. A method of facilitating loading and unloading of containers onto and off of a container ship comprising the steps of:

providing a fixed pier having a container ship moored thereto and a crane disposed thereon for loading and unloading containerized cargo on the ship;

providing an array of ultrasonic sensors on the crane and directed toward the ship;

projecting a sound or radio signal from each of the ultrasonic sensors against the ship and receiving the delayed return sound signal;

employing a video camera on the crane and directed toward a target on the ship;

providing a sensor processor on the crane and employing the sensor processor to receive and combine the delayed return signal with the pixel projections received from the video camera processor and convert the combined signals into a distance measurement between the crane and the ship;

providing a loading processor and a processor controller on the crane;

employing the process controller to convey data to the loading processor from the crane as to the exact location of the previously loaded container on the container ship, or the spot from which the previously unloaded container was taken from the container ship;

conveying the data received from the processor controller to the sensor processor;

employing the sensor processor to combine the data received from the loading processor with the distance position data received from the ultrasonic range finders and from the video camera and, after adding an estimate of error thereto, to convey this combined data through the loading processor and process controller to the crane controls to designate the exact position of the container ship where the next container is to be loaded or unloaded.

* * * * *